(12) United States Patent
Nalala Pochaiah et al.

(10) Patent No.: US 11,454,957 B2
(45) Date of Patent: Sep. 27, 2022

(54) SYSTEMS AND METHODS FOR OPERATION AND DESIGN OF INDUSTRIAL SYSTEM

(71) Applicant: Schneider Electric Systems USA, Inc., Foxboro, MA (US)

(72) Inventors: Anil Kumar Nalala Pochaiah, Telangana (IN); James P. McIntyre, San Jose, CA (US); Sarat Kumar Reddy Molakaseema, Lower Austria (AT)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 236 days.

(21) Appl. No.: 16/901,626

(22) Filed: Jun. 15, 2020

(65) Prior Publication Data
US 2021/0311463 A1 Oct. 7, 2021

(30) Foreign Application Priority Data
Apr. 3, 2020 (IN) .............................. 202011014910

(51) Int. Cl.
*G05B 13/02* (2006.01)
*G05B 19/418* (2006.01)
(Continued)

(52) U.S. Cl.
CPC ......... *G05B 19/41865* (2013.01); *G06F 8/61* (2013.01); *G06N 20/00* (2019.01); *G05B 2219/31449* (2013.01)

(58) Field of Classification Search
CPC .............................................. G05B 19/41865
(Continued)

(56) References Cited

U.S. PATENT DOCUMENTS 9,412,073 B2 * 8/2016 Brandt .................... H04L 63/20
10,234,853 B2 * 3/2019 Mukkamala ........ G06F 3/04847
(Continued)

FOREIGN PATENT DOCUMENTS

CN 1144025 A * 2/1997 ............. H04Q 11/04

OTHER PUBLICATIONS

Holoblock Inc. "IEC 61499 A Standard for Software Reuse in Embedded, Distributed Control Systems" Sep. 18, 2008, 9 pages, [ online][retrieved on Apr. 4, 2022], Retrieved from <https://www.holobloc.com/papers/iec61499/overview.htm>.*
(Continued)

*Primary Examiner* — Evral E Bodden
(74) *Attorney, Agent, or Firm* — Stinson LLP

(57) ABSTRACT

Configuring distributed control in an industrial system comprises building an asset model representative of a process control installation of the industrial system and creating an asset library of distributed control assets according to a distributed control programming standard. The asset model includes modeled assets defined according to levels of a physical model standard and representing physical devices of the industrial system. The distributed control assets each have one or more predefined, built-in facets. One of the distributed control assets in the asset library is mapped to each of the modeled assets to configure the process control installation of the industrial system and generate an asset-based control application for providing distributed control of the industrial system. Additional aspects relate to auto-creation of control applications based on an information model, either through the use of machine learning or an asset configurator tool.

21 Claims, 18 Drawing Sheets

(51) Int. Cl.
   *G06N 20/00* (2019.01)
   *G06F 8/61* (2018.01)
(58) Field of Classification Search
   USPC .......................................................... 700/28
   See application file for complete search history.

(56) References Cited

U.S. PATENT DOCUMENTS

| 10,732,597 | B2* | 8/2020 | Linscott | G05B 19/056 |
| 11,227,080 | B2* | 1/2022 | Thomsen | G06F 40/117 |
| 2016/0246276 | A1* | 8/2016 | Rischar | G05B 19/042 |

OTHER PUBLICATIONS

Monika Wenger et al., "Utilizing IEC 61499 in an MDA control application development approach", Automation Science and Engineering (CASE), 2011 IEEE Conference On, IEEE, Aug. 24, 2011, pp. 495-500.

www.holobloc.com; "Screenshot of the IEC 64199 function block development kit "holobloc"", Apr. 8, 2018, pp. 1-1.

Asafi Y et. al.; "Ontology-based reconfiguration agent for intelligent mechatronic systems in flexible manufacturing", Robotics and Computer Integrated Manufacturing, Elsevier Science Publishers BV., Barking, GB, vol. 26, No. 4, Aug. 1, 2010, pp. 381-391.

Drozdov Dmitrii et al. "Speculative computation in IEC 61499 function blocks execution—Modeling and simulation" 2016 IEEE 14th Interational Conference On Industrial Informatics, IEEE Jul. 19, 2016, pp. 748-755.

Fischer John, et al. "Workbook for Designing Distributed Control Applications using Rockwell Automation's HOLOBOC Prototyping Software", Mar. 1, 2017, pp. 1-93.

Rajiyer, "Forum discussing which proves that "Workbook for designing . . . " was available at public in 2017", Mar. 1, 2017, pp. 1-1.

Extended European Search Report for European Patent Application No. 21166604.5, dated Jul. 30, 2021, 12 pages.

* cited by examiner

SYSTEMS AND METHODS FOR OPERATION AND DESIGN OF INDUSTRIAL SYSTEM

BACKGROUND

Aspects of the present disclosure generally relate to industrial process automation and control systems. More particularly, aspects of the present disclosure relate to systems and methods for performing industrial plant commissioning, designing, visualization, simulation, diagnostics, and operations.

The need for distributed control topologies has resulted in the development of a programming language standard, such as IEC 61499, dedicated to distributed (event-based) industrial applications. Generally, IEC 61499 defines a generic architecture that enables an application-centric design in which one or more applications, defined by networks of interconnected function blocks, are created for the whole system and subsequently distributed to available devices. All devices within a system are described within a device model and the topology of the system is reflected by the system model. The distribution of an application is described within the mapping model. Therefore, applications of a system are distributable but maintained together. In this manner, an application contained in one project can be mapped and executed on a plurality of automation controllers.

In the IEC 61499 architectural model, distributable applications are built by interconnecting instances of reusable function block types with appropriate event and data connections in the same manner as designing a circuit board with integrated circuits. Using IEC 61499-compliant software tools, these function blocks can then be distributed across a network to physical devices (controllers) compliant with IEC 61499 and, thus, configure distributed control and automation systems from libraries of reusable IEC 61499-compliant components.

SUMMARY

Briefly, aspects of the present disclosure permit defining and modeling of assets that have built-in facets based on the IEC 61499 standard. Such facets are readily available to users for mapping to physical devices or to control language or narrative (e.g., HMI, Control, Alarms & Events, Scan and/or Event driven modes, Simulation, etc.). Moreover, a flexible application design and auto-creation solution based on an information model permits improved distributed intelligence and targeting toward zero engineering efforts with respect to design and auto-creation of industrial applications. Aspects of the present disclosure also permit auto-creating control applications, either through the use of machine learning or an asset configurator tool.

In an aspect, a method of configuring distributed control in an industrial system comprises building an asset model representative of a process control installation of the industrial system and creating an asset library of distributed control assets according to a distributed control programming standard. According to the method, the asset model includes a plurality of modeled assets defined according to levels of a physical model standard and modeled assets representing physical devices of the industrial system. The distributed control assets each have one or more predefined, built-in facets. The method further includes mapping one of the distributed control assets in the asset library to each of the modeled assets to configure the process control installation of the industrial system and generating at least one asset-based control application that, when executed by one or more controllers of the process control installation, provides distributed control of the industrial system.

In another aspect, a system comprises a processor and a storage memory coupled to the processor. The storage memory stores processor-executable instructions that, when executed by the processor, configure the processor for building an asset model representative of a process control installation of the industrial system and creating an asset library of distributed control assets according to a distributed control programming standard. The asset model comprises a plurality of modeled assets defined according to levels of a physical model standard and representing physical devices of the industrial system. The distributed control assets each have one or more predefined, built-in facets. The processor-executable instructions further configure the processor for mapping one of the distributed control assets in the asset library to each of the modeled assets to configured the process control installation of an industrial system and generating at least one asset-based control application that, when executed by one or more controllers of the process control installation, provides distributed control of the industrial system.

In yet another aspect, a method of building an asset control model for use in configuring a distributed control system includes creating an asset control model library configured to store a plurality of distributed control assets and defining the distributed control assets according to a distributed control programming standard. The distributed control assets represent a process control installation of an industrial system and are mapped from one or more physical assets and one or more control assets defined according to levels of a physical model standard. The method further includes providing each of the distributed control assets with one or more predefined, built-in facets, populating the asset control model library with the distributed control assets having the one or more predefined, built-in facets, and generating at least one asset-based control application that, when executed by one or more controllers of the process control installation, provides distributed control of the industrial system.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
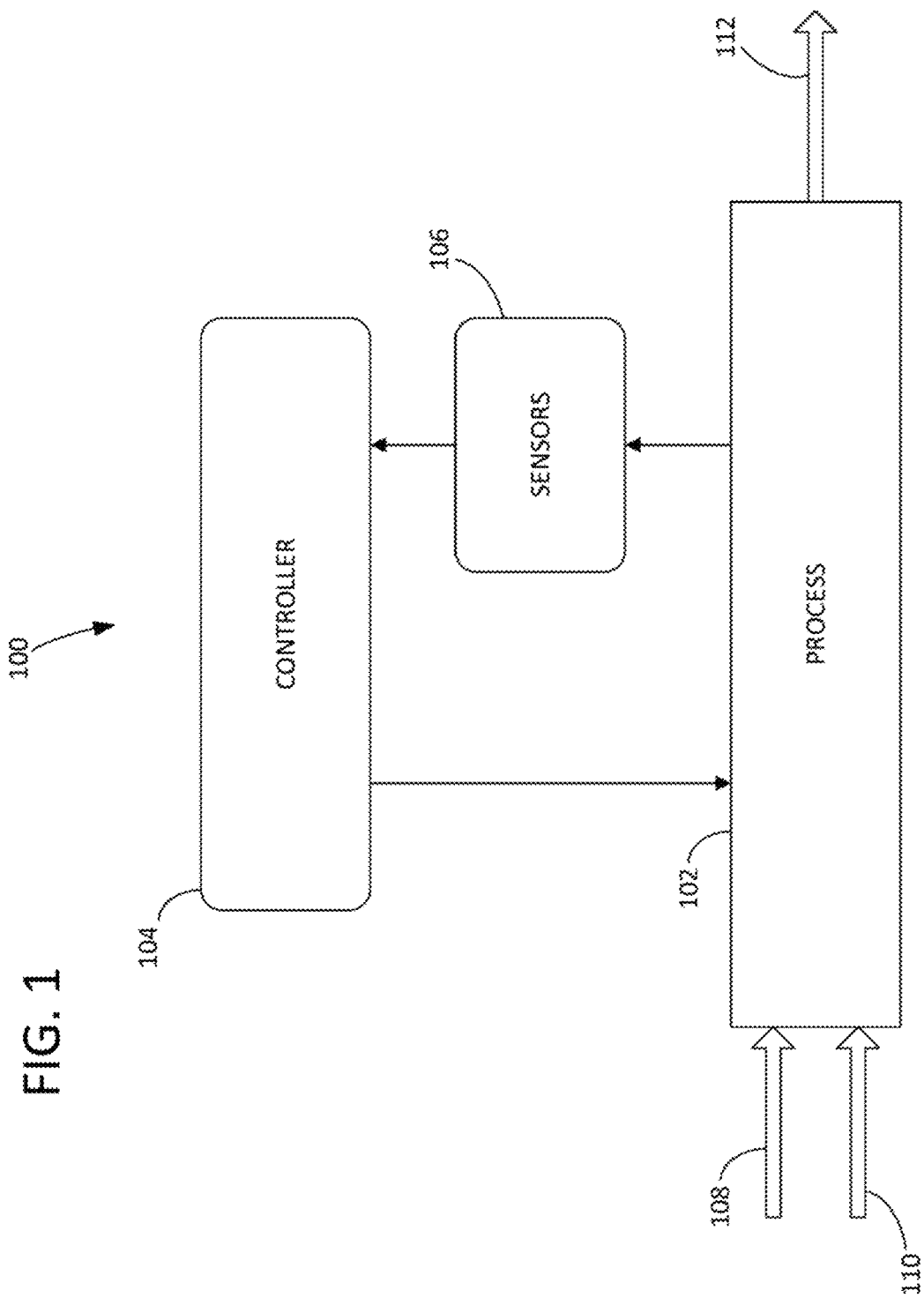
FIG. 1 is a block diagram illustrating a process control system according to an embodiment.

Referring now to the drawings, aspects of the present disclosure permit defining and modeling of assets and generating a library of such asset models for an industrial system. The asset library contains programming elements (e.g., basic and composite blocks) required to build the assets. In an embodiment, these programming elements are defined according to a distributed control programming standard such as IEC 61499. The models indicate relationships (e.g., different physical model levels) between physical assets and control assets, which permit mapping the asset library to physical devices and control language or narrative. In addition, aspects of the present disclosure utilize the Information model to build and design control applications for executing distributed control in the industrial system automatically or auto-created. For instance, an asset automation type (AAT) function block network may be auto-created based on the information model and asset library using a configurator tool or machine learning.

Moreover, aspects of the present disclosure provide the ability to design and simulate operation of the industrial system using the asset model library, which permits evaluation of the simulated operation to identify potential improvements to a proposed system design. Aspects of the present disclosure further permit modifying and refining the models based on user feedback and machine learning.

FIG. 1 displays the basic structure of an exemplary process control system 100. In an embodiment, the process 102 is communicatively connected to the controller 104 and the sensors 106. The process has inputs 108 and 110 that comprise the necessary inputs for the process to create the output 112. In an embodiment, the input 108 includes energy for powering the process 102 and the input 110 includes physical or chemical raw materials for use in the process 102. The output 112 comprises physical or chemical products from the process or produced energy in the form of electricity or the like.

The controller 104 sends data to the process 102 in order to direct the operations of the process 102 according to the goals of the controller 104. The data sent comprises commands which operate various types of control elements, or assets, in the process, such as valves, actuators, or the like. An asset may be any mechanical, chemical, electrical, biological, or combined mechanism or set of mechanisms that is used to convert energy and materials into value added products or production. The sensors 106 monitor the process at various points and gather data from those points. The sensors 106 send the data gathered to the controller 104. Based on the gathered data, the controller 104 can then send additional commands to the process 102. In this way, the system forms a control feedback loop, where the controller 104 reacts to changes in the process 102 as observed by the sensors 106. Different actions carried out by the process 102 according to the commands of the controller 104 may result in the data being gathered by the sensors 106 changing, causing further adjustments by the controller 104 in response to those changes. By implementing this control feedback loop, the process 102 can be controlled by the controller 104 in an efficient manner.

Figure 2:
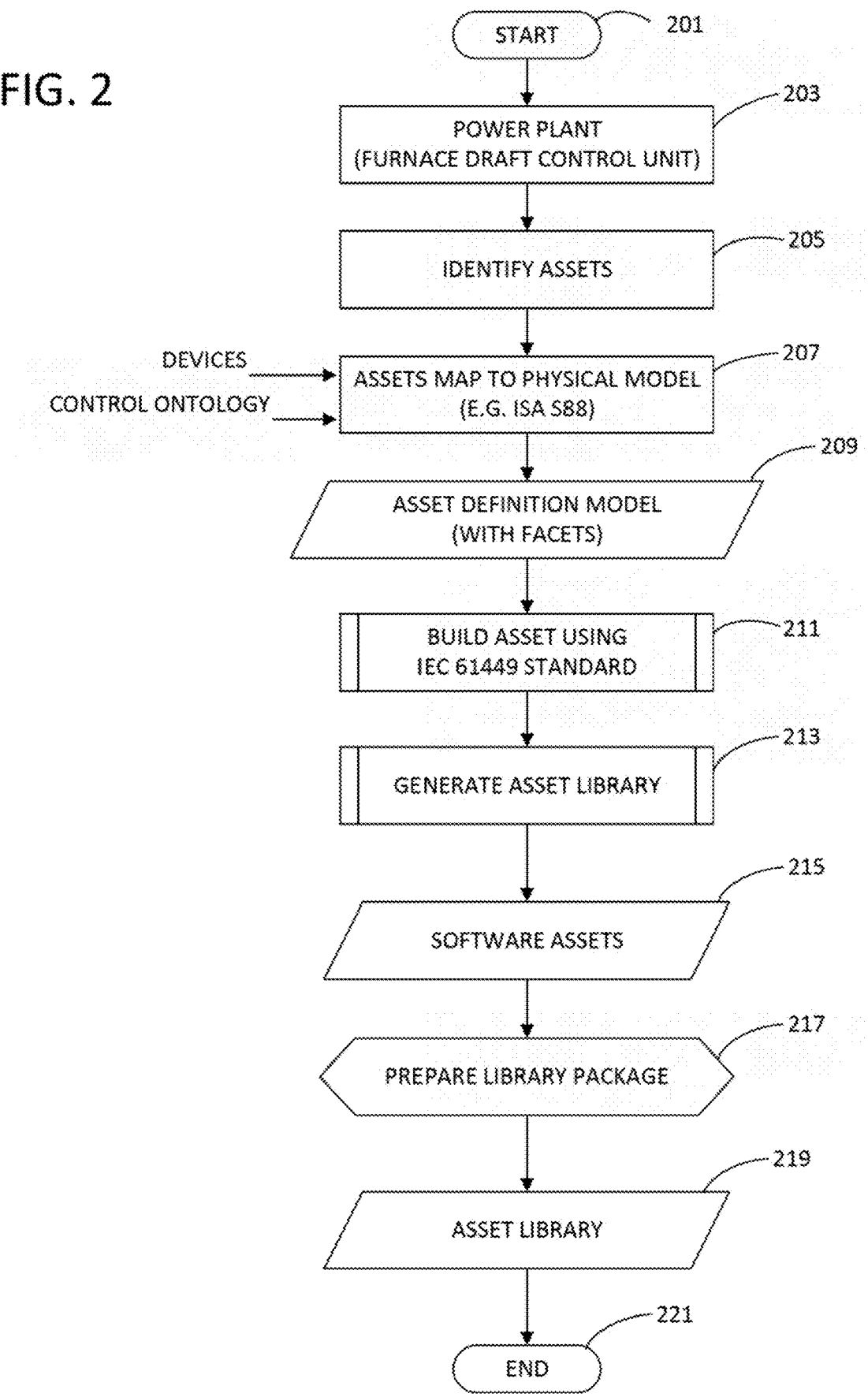
FIG. 2 is a flow diagram of an example process for building assets of the process control system according to an embodiment.

Aspects of the present disclosure permit configuring distributed control in an industrial system. FIG. 2 is a flow diagram of an example process for identifying assets of the industrial system, defining and building an asset model representative of a process control installation of the industrial system, and creating an asset library of distributed control assets according to a distributed control programming standard.

Beginning at 201, an embodiment of the present invention builds an asset model that includes a plurality of modeled assets defined according to levels of a physical model standard and in which the distributed control assets each have one or more predefined, built-in facets. In the illustrated embodiment, the method further includes mapping one of the distributed control assets in the asset library to each of the modeled assets to configure the process control installation of the industrial system and generating at least one asset-based control application that, when executed by one or more controllers 104 of the process control installation, provides distributed control of the industrial system.

Figure 3:
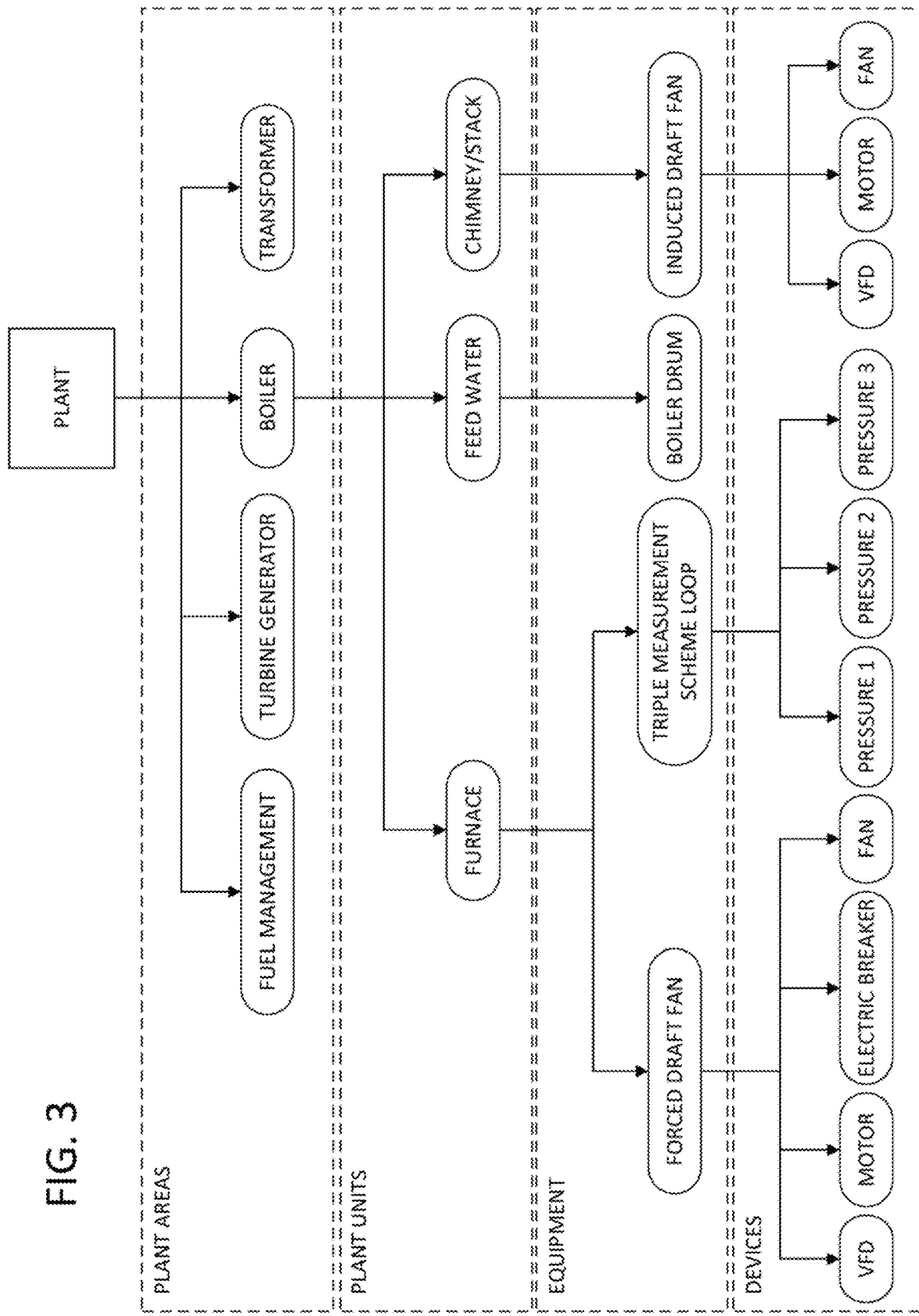
FIG. 3 is a block diagram illustrating an asset-based control model hierarchy identifying physical assets of the process control system according to an embodiment.

In the illustrated embodiment, process 102 comprises a furnace draft control of a power plant at 203. Continuing at 205, assets of the process control installation are identified. FIG. 3 illustrates an example asset-based control model that takes a top down design approach for identifying physical assets in the power plant. In accordance with aspects of the invention, the identified physical assets align with a physical model standard, such as ISA S88 Physical Model. Similarly, referring to FIG. 4, the example asset-based control model also takes a top down design approach for identifying control assets (or templates) in the power plant. At 207, the identified assets are mapped to the physical model, for instance, the ISA S88 Physical Model, which includes levels of: Plant area, Unit, Equipment, and Device.

Figure 4:
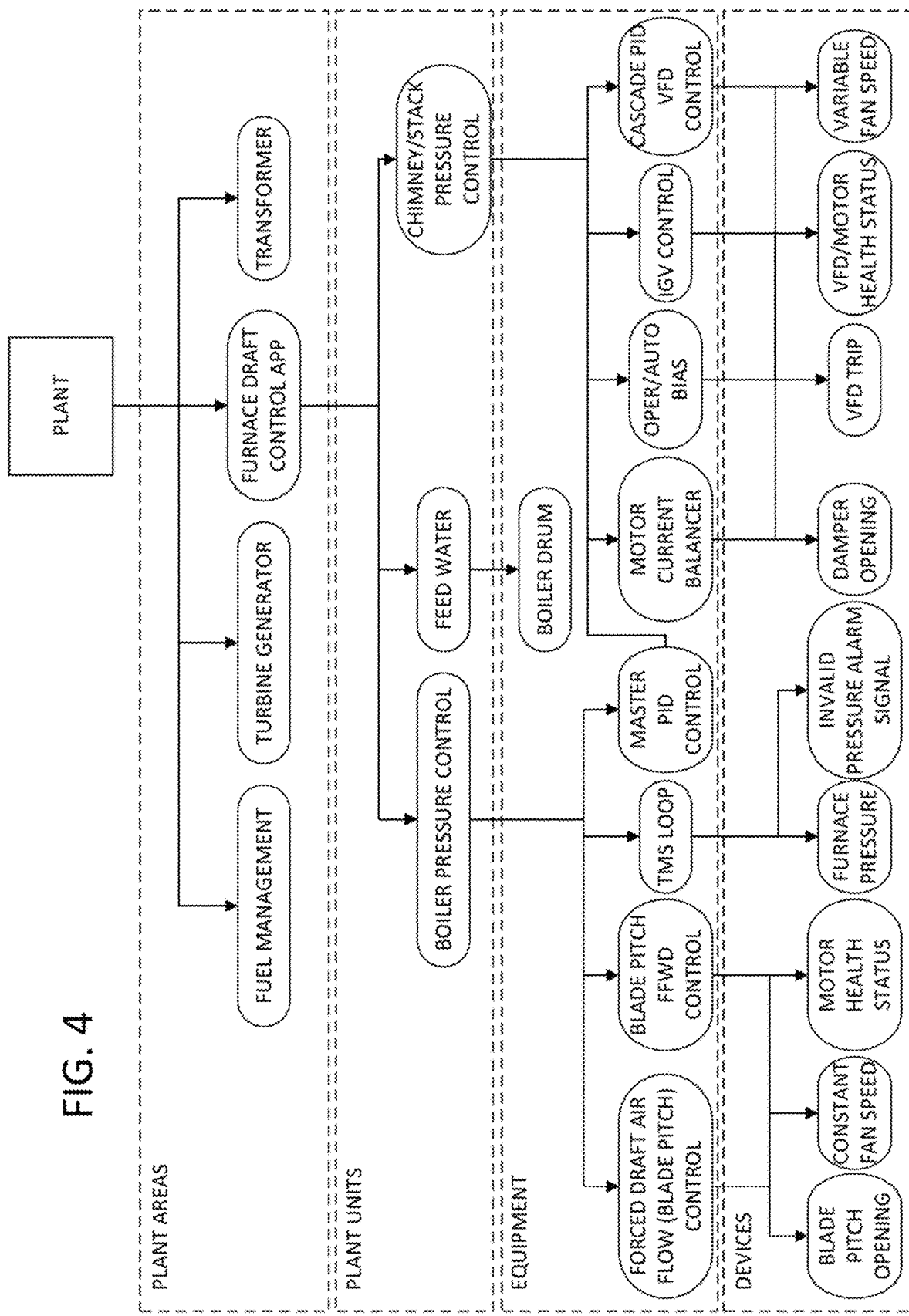
FIG. 4 is a block diagram illustrating an asset-based control model hierarchy identifying control assets of the process control system according to an embodiment.

FIG. 3 illustrates an asset-based control model hierarchy identifying physical assets of an industrial system. In this illustrated example, the industrial system is a power generation plant. The model hierarchy employs ISA 88 physical model levels for initial design: Plant; Area; Unit; Equipment; and Device. As illustrated, higher level assets are composites of lower level assets and their own assets. FIG. 4 illustrates an asset-based control model hierarchy identifying control assets, which are the control language for performing operations on outputs of the physical assets. The workflow for controlling an operation of the plant can be constructed from physical assets and control assets. For example, a furnace draft control (FDC) uses the following assets: variable fan drive, motor, fan, electric breaker, pressure transmitter, etc. Each asset includes a representation of a physical device as well as associated code for facets. Different facets are needed for different assets. For example, a pressure transmitter asset is mapped to a physical pressure transmitter device and its control logic. In another example, assets are mapped to control language or narrative.

Aspects define a control model based hierarchy of assets. In an embodiment, assets are software objects representative of physical devices and/or control logic in an industrial system. Assets are based on ISA-88 physical model.

TABLE I, below, provides examples of physical model level names:

TABLE I

| Physical Model Level | Level Name Definition | Examples |
|---|---|---|
| Unit | An Equipment grouping to carry out one or more processing activities such as reaction, crystallization, or distillation. It combines all necessary physical processing and control process equipment required to perform those activities as an independent process equipment grouping. | Reactor Distillation Column Wet End Contactor Dry End Separator Pulper Dry/Wet Oil Tanks Filters LACT Unit Compressor Pipeline Pumps Well Head Hydrocyclone Reboiler Floatation Cell |
| Equipment | A collection of physical devices and process hardware that performs a finite number of specific processing activities. | Pump Set Compressor Control Loop Feed System Analyzer and Sampling System |
| Device | The lowest level of physical hardware in the Physical Model in a Process. | Analyzer Control Valve Pump Temperature Transmitter Instrument Motor |

Figure 5:
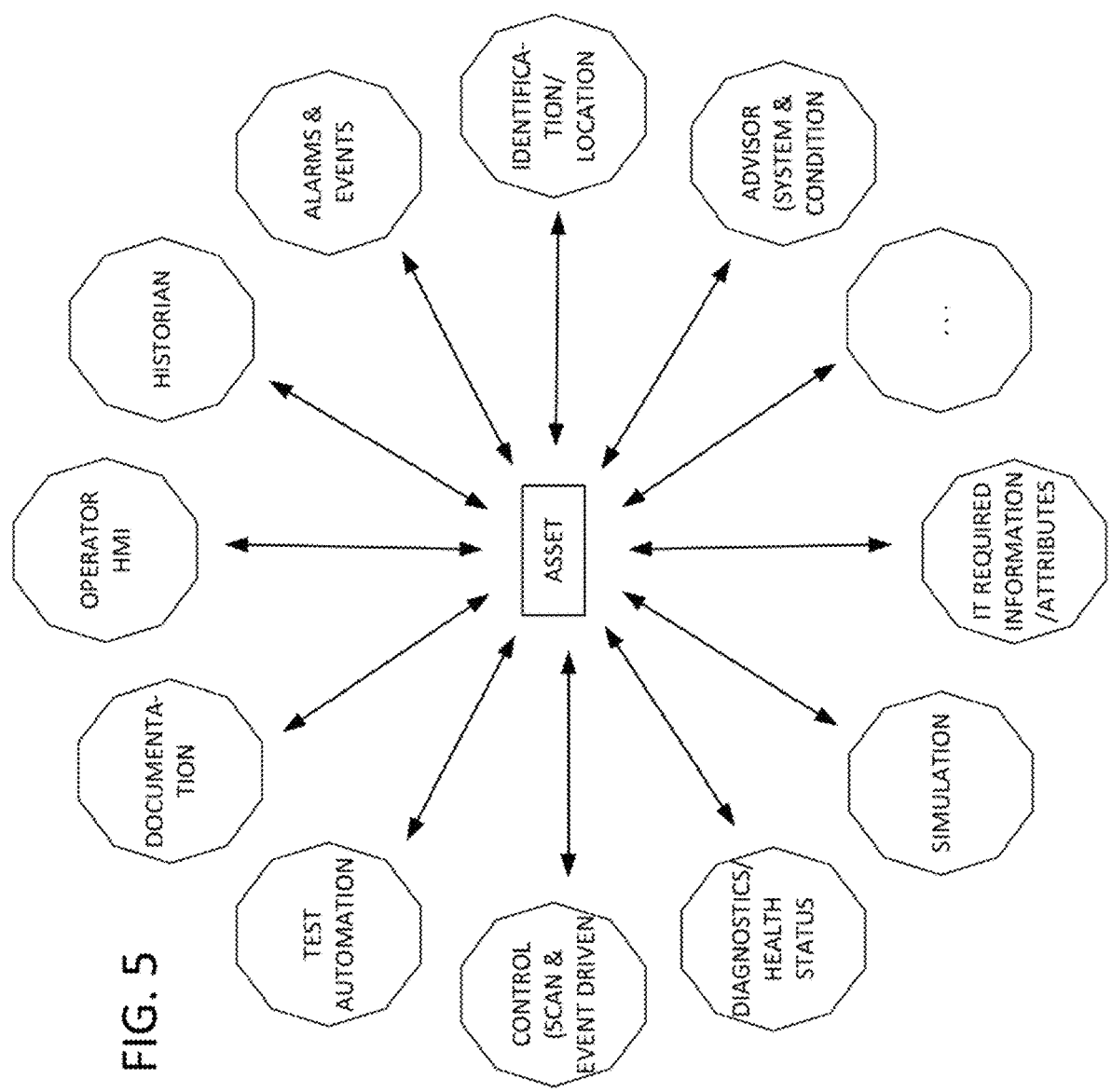
FIG. 5 is a block diagram illustrating an asset having defined facets associated therewith according to an embodiment.

Referring further to FIG. 2 at 209, the illustrated process outputs an asset model defined with supported facets, which may be customized per customer requirements. Defining the asset model includes asset modeling and identification of various facets, identification of control logic facets, and human-machine interface (HMI) facet identification. FIG. 5 shows an asset definition with associated facets/capabilities. The model defines the assets to have built-in facets. The facets represent functionality/features. Built-in facets include one or more of the following: Documentation, Operator HMI, Alarms & Events, Simulation, and Control (Scan & Event Driven). In addition, built-in facets may include one or more of: Historian, Identification/Location, Advisor (System & Condition), IT Required Information/ Attributes, Diagnostics/Health Status, and Test Automation.

Figure 6:
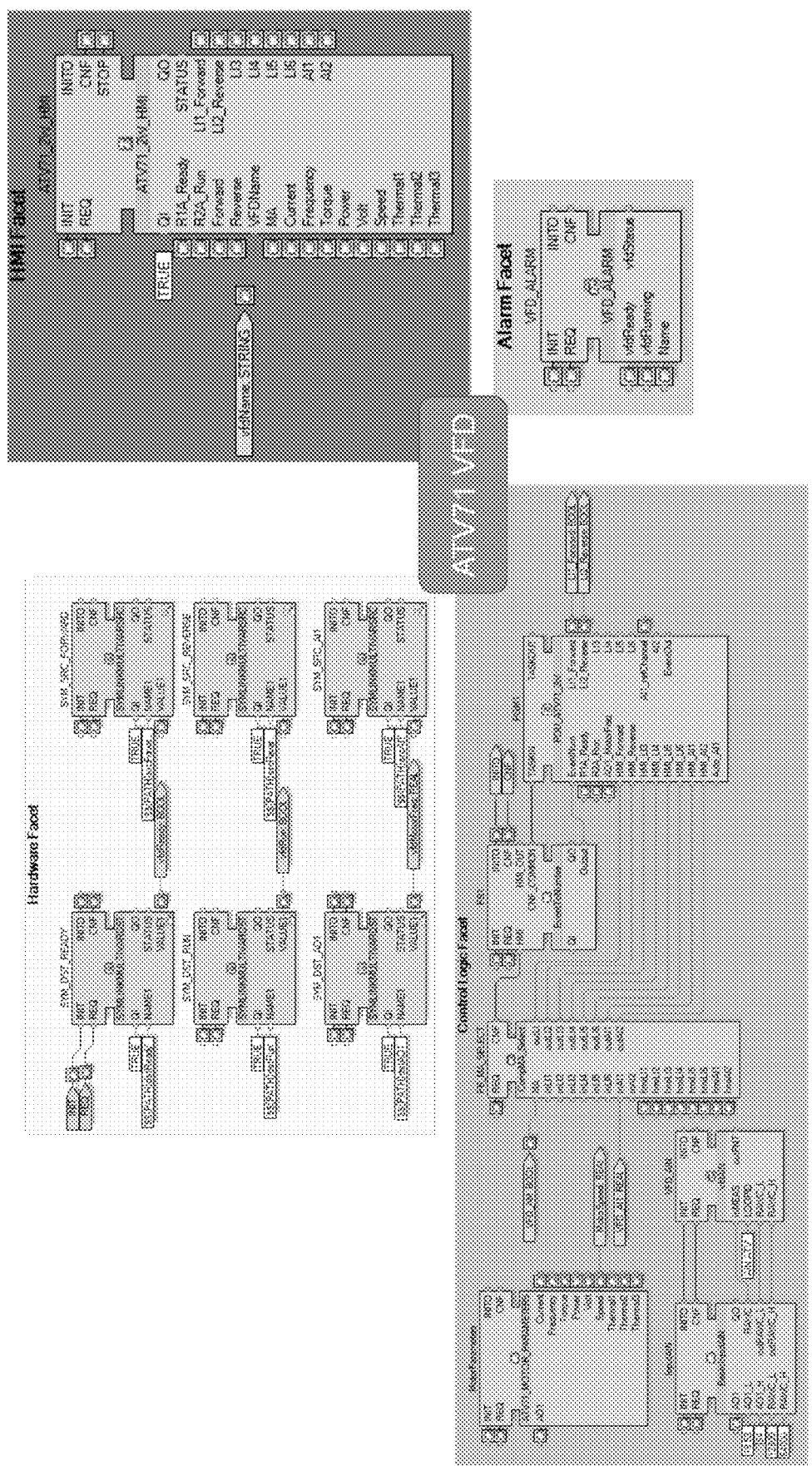
FIG. 6 is an example of an asset model designed for a variable frequency drive according to an embodiment.
Figure 7:
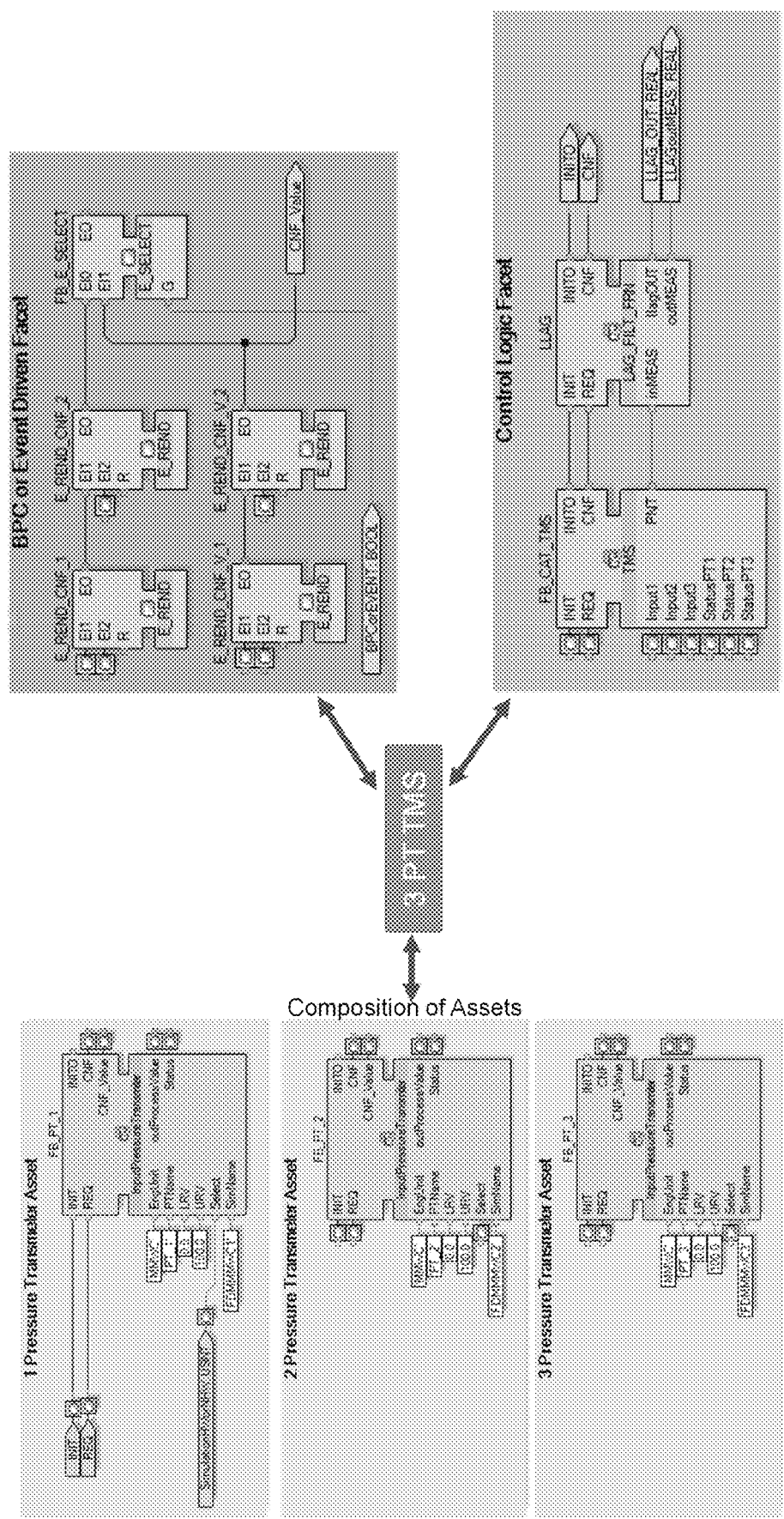
FIG. 7 is an example of an equipment asset model comprised of three pressure transmitters according to an embodiment.
Figure 8:
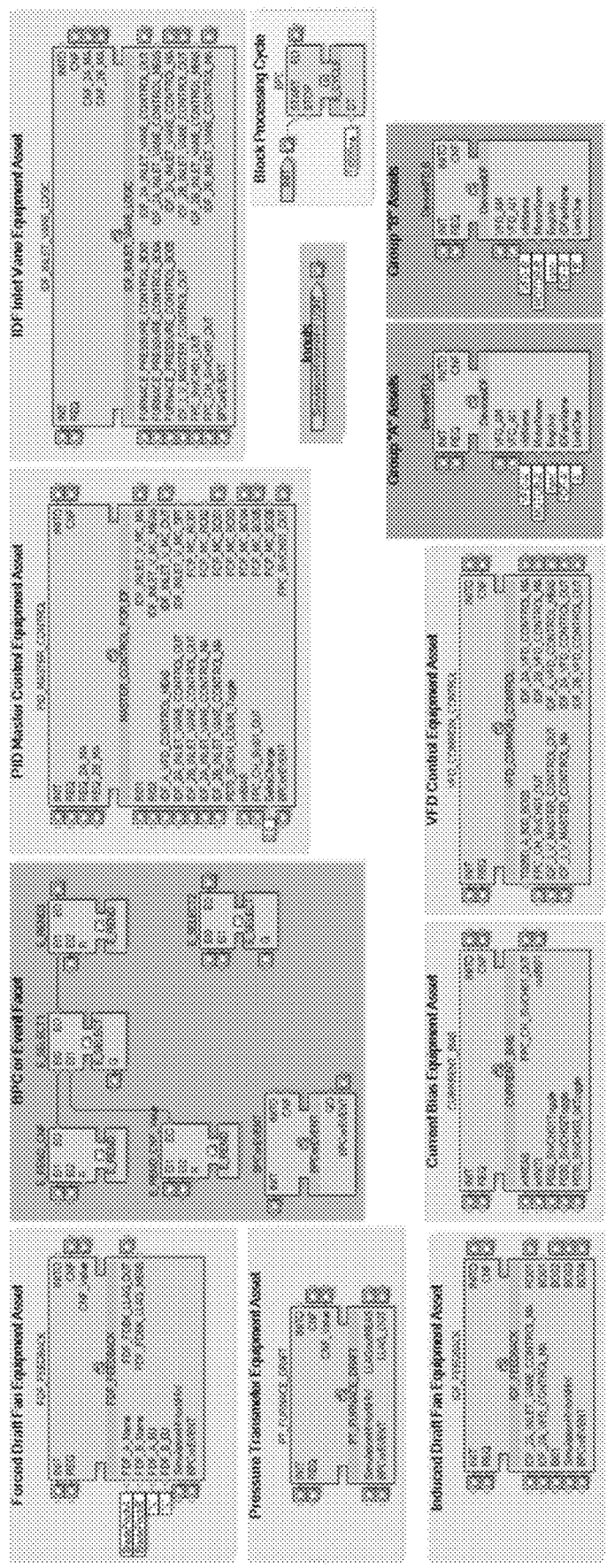
FIG. 8 is an example screen shot illustrating a relationship between physical and control assets according to an embodiment.
Figure 9:
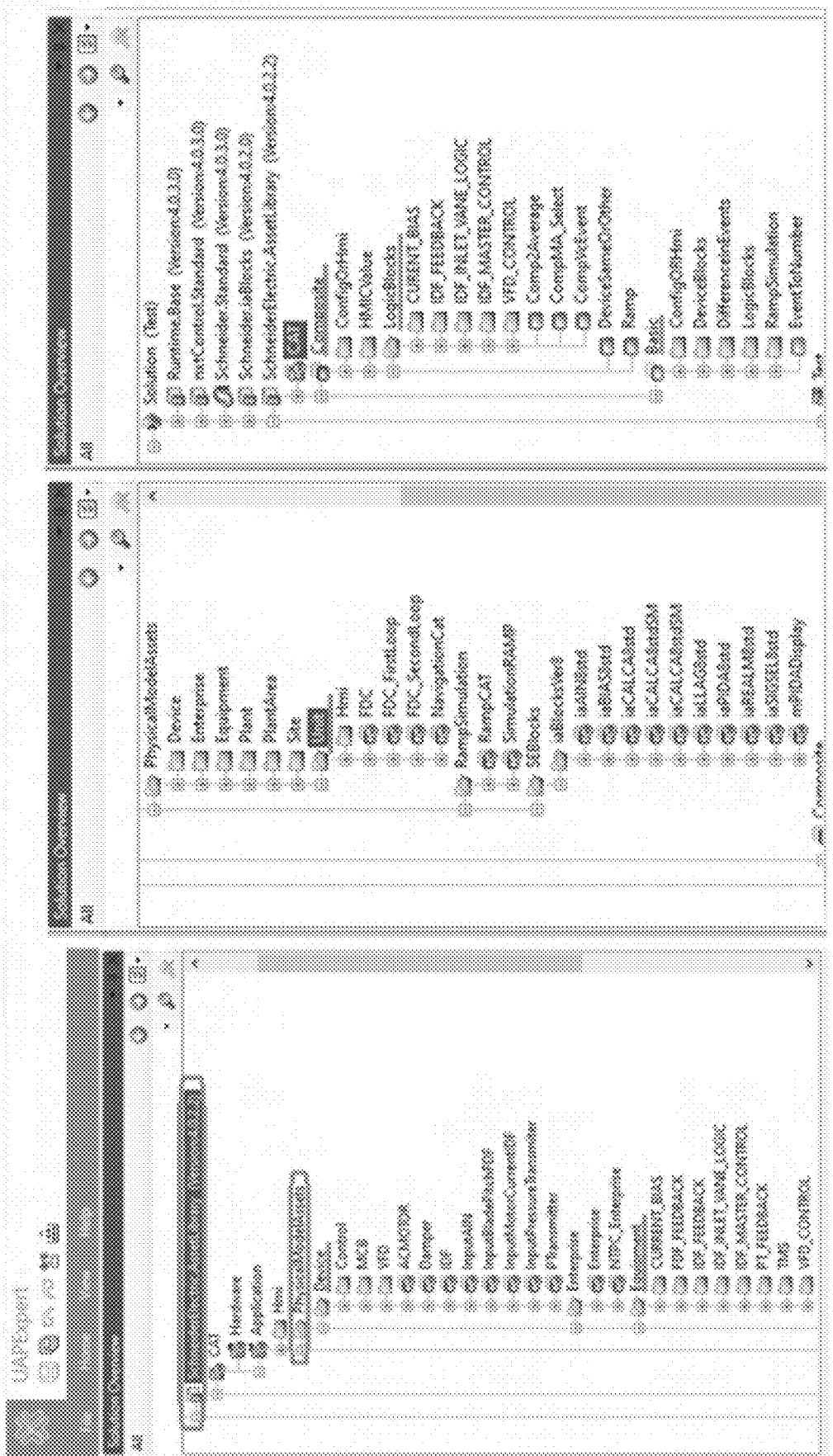
FIG. 9 is an example screen shot illustrating an asset library categorization folder structure according to an embodiment.

At 211 of FIG. 2, a subroutine builds the assets using a distributed control programming standard, such as the IEC 61449 standard. FIGS. 6, 7, and 8 illustrate examples of assets, comprised of function blocks, on a canvas for the HMI. FIG. 6 is an example of asset model designed for a variable frequency drive (e.g., Altivar 71 variable speed drive available from Schneider Electric), including implemented facets. FIG. 7 is an example of an equipment asset model comprised of three pressure transmitters employed over by Triple Measure Scheme/circuitry, including supported facets. FIG. 8 is an example screen shot illustrating a relationship between physical and control assets (device+ equipment), namely, unit level assets: composition of device and equipment assets as part of furnace draft control unit. At 213 of FIG. 2, the process executes a predefined process to generate an asset library. Referring further to FIG. 2, the illustrated process outputs the defined software assets at 215 and prepares the asset library package at 217. FIG. 9 is an example screen shot illustrating an asset library categorization folder structure. In this embodiment, the folder structure is organized according to the physical model and pre-defined block, composite—logic blocks, basic blocks, etc.).

Figure 10:
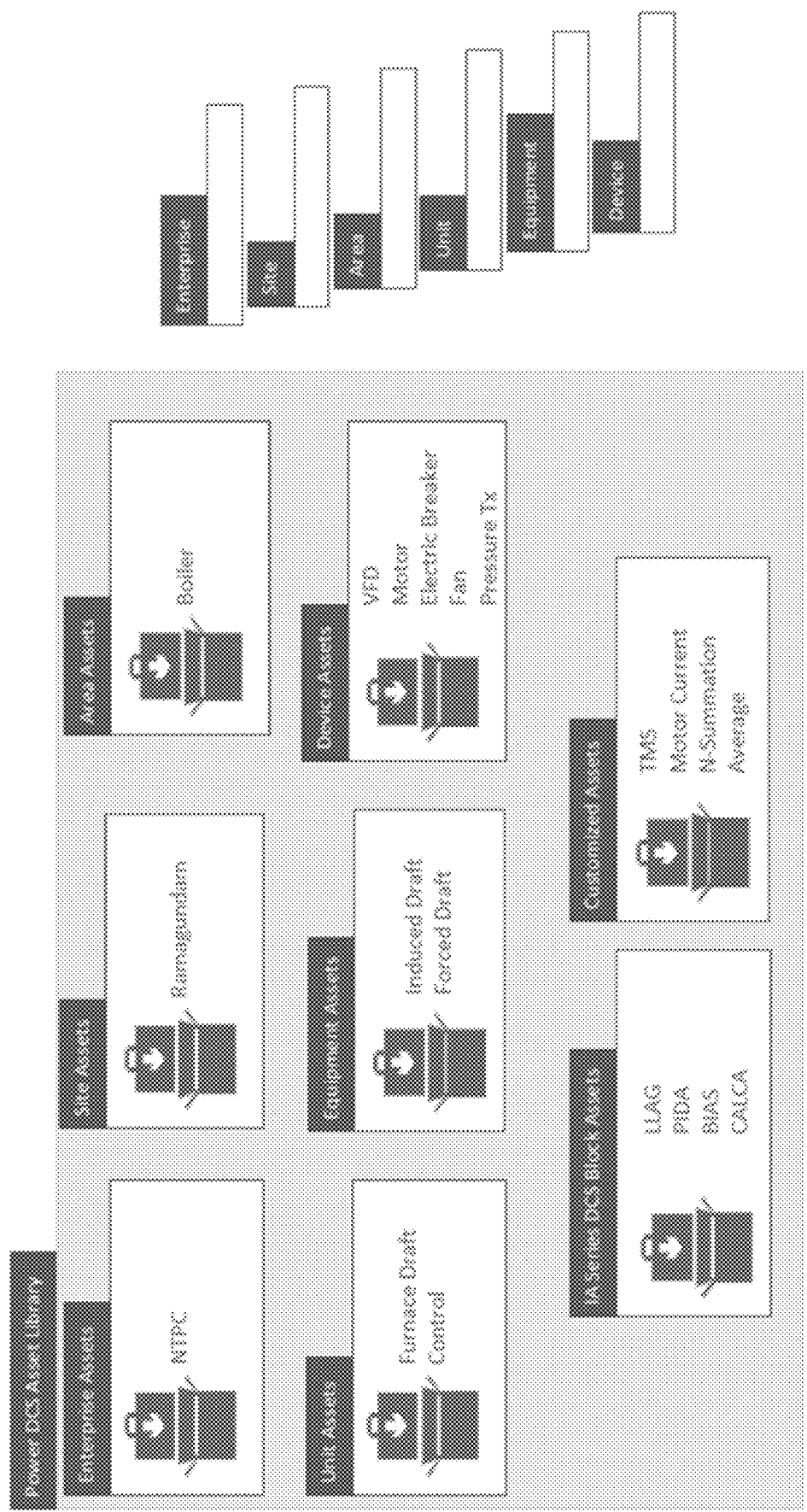
FIG. 10 is a block diagram of an example of an asset library built for a furnace draft control application according to an embodiment.

The control logic of a machine, equipment, process, or building can be programmed, loaded on a controller, or even distributed to several controllers. When commissioning a plant, the assets needed are first determined for building an assets library. Referring further to FIG. 2, the illustrated process outputs the library at 219 and ends at 221. FIG. 10 shows an example of an asset library built for the furnace draft control application mapping to the ISA 88 physical model.

Figure 11:
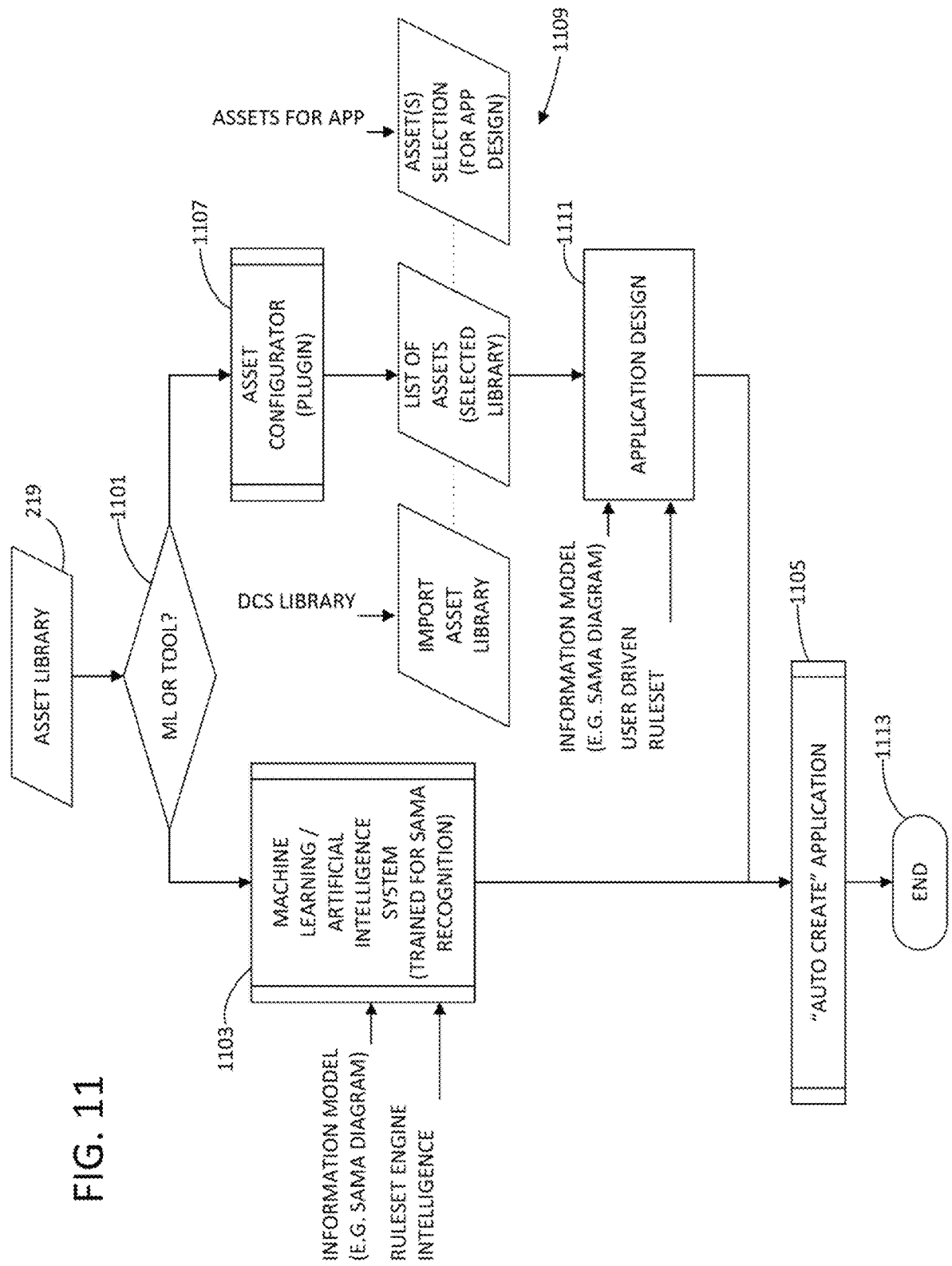
FIG. 11 is a flow diagram illustrating further aspects of the example process of FIG. 2.

FIG. 11 illustrates aspects of an example flow diagram continuing the process of FIG. 2. In an embodiment, an outcome of FIG. 2 (the asset library) acts as input to FIG. 11, i.e., "Auto Creation" of application design through machine learning and asset configuration tool concepts. The method includes mapping one of the distributed control assets in the asset library to each of the modeled assets to configure the process control installation of the industrial system and generating at least one asset-based control application that, when executed by one or more controllers 104 of the process control installation, provides distributed control of the industrial system. As shown in FIG. 11, operations continue from the output of the asset library at 219 for auto-creating control applications, either through the use of machine learning or an asset configurator tool.

If employing machine learning at 1101, a machine learning subroutine at 1103 receives input of an information model and executes ruleset engine intelligence for mapping the information model to the assets in the asset library to auto-create the control application at 1105. The input is representative of the process control installation of the industrial system and the asset model is built in response to the received input. In an embodiment, the input information model is in the form of a Scientific Apparatus Makers Association (SAMA) diagram familiar to those skilled in the art.

Figure 12:
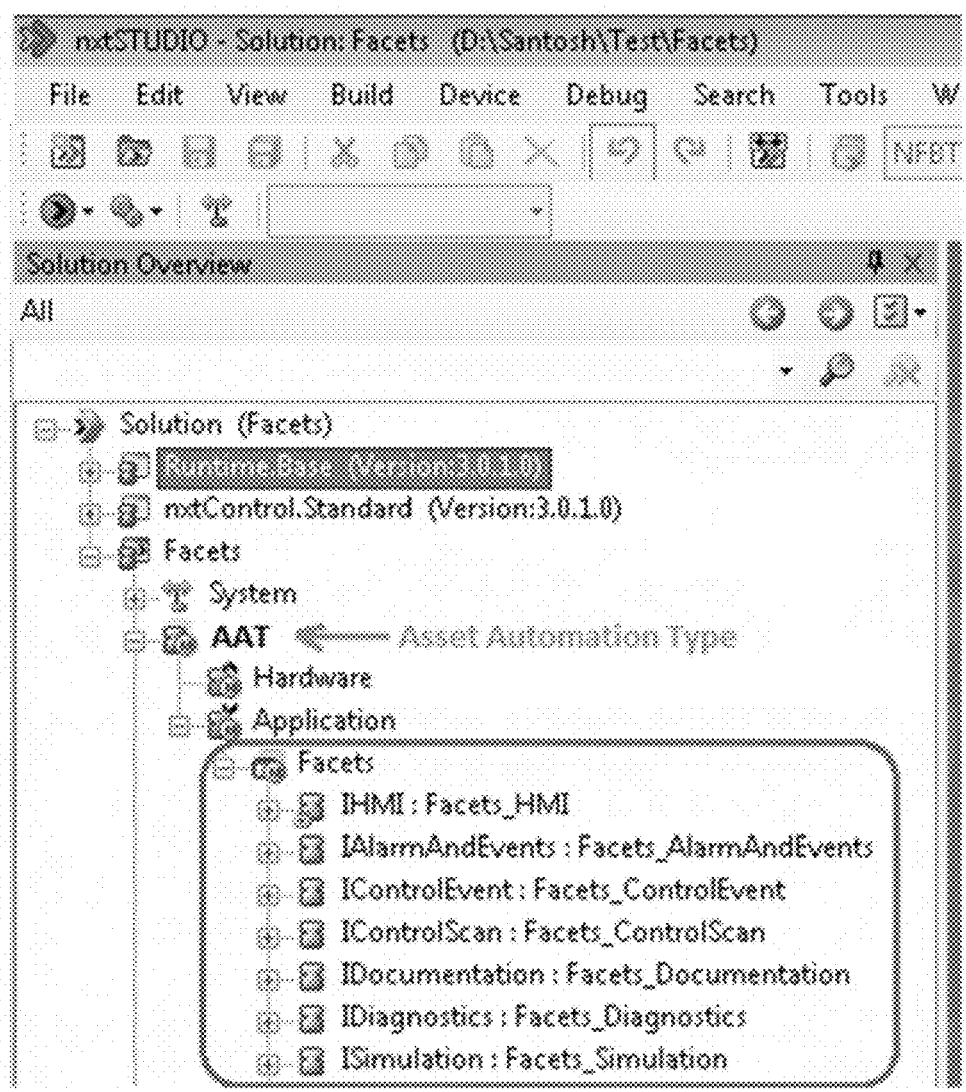
FIG. 12 is an example screen shot illustrating an asset automation type object according to an embodiment.
Figure 13:
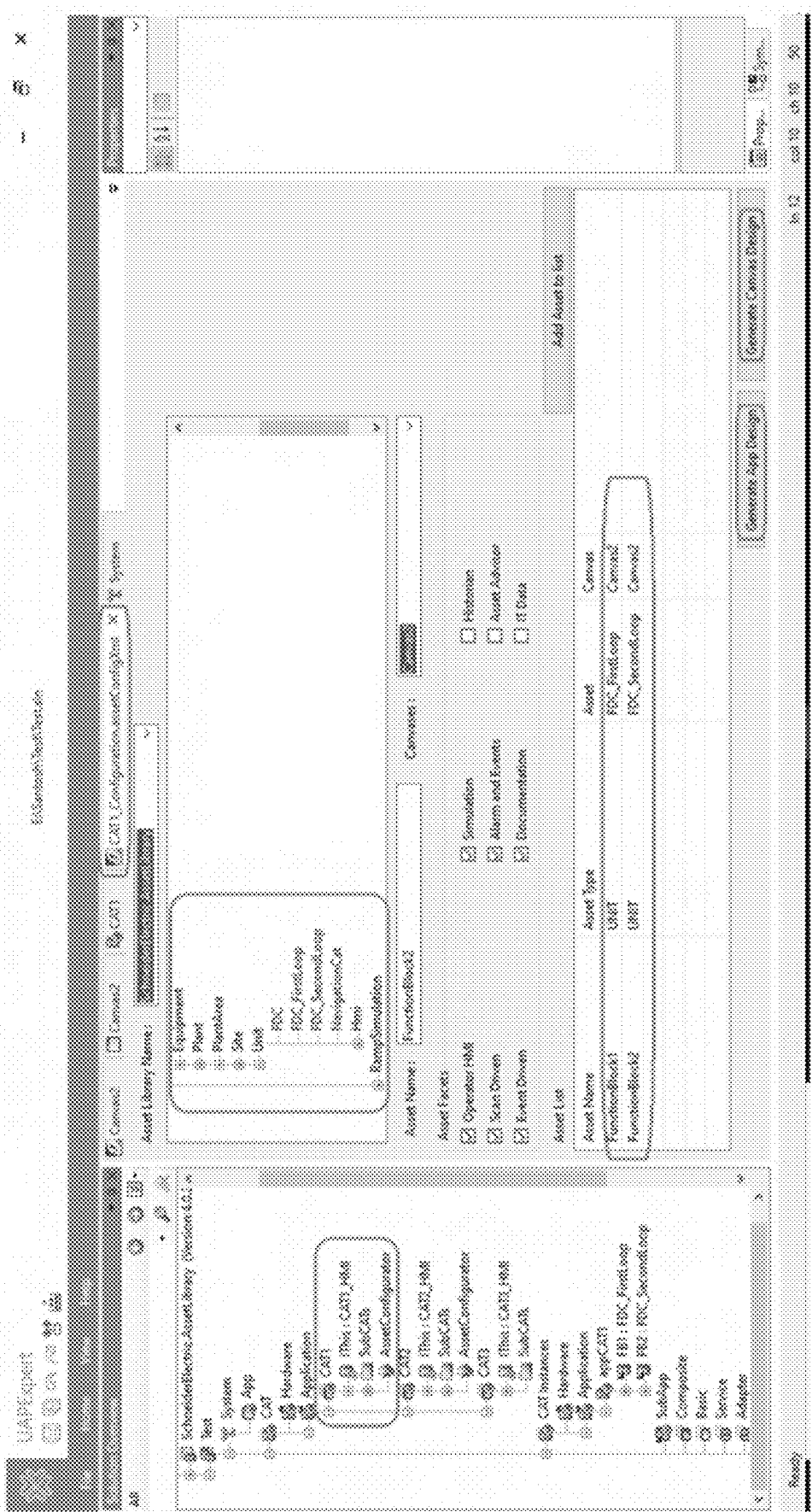
FIG. 13 is an example screen shot illustrating a user interface of an asset configurator tool according to an embodiment.

On the other hand, if employing an asset configurator tool, an asset configurator subroutine at 1107 generates the industrial control application from auto populated assets and templates loaded from the asset library at 1109. FIG. 12 is an example screen shot illustrating an AAT object created using the configurator tool and FIG. 13 is an example screen shot illustrating a user interface of the asset configurator tool by which the user can select the required objects from the auto-populated Asset Library hierarchy and auto-create the complete application design ready for the deployment.

In an embodiment, a user loads an existing application design file at 1111 to evolve or improve the existing industrial application design based on the information model and a user-driven ruleset for auto-creating the application at 1105. Similarly, the input on which the application design is based is representative of the process control installation of the industrial system. In an embodiment, the existing application design file may have been generated through either machine learning intelligence or a previous use of the configurator tool. The example process of FIG. 11 terminates at 1113.

Figure 14:
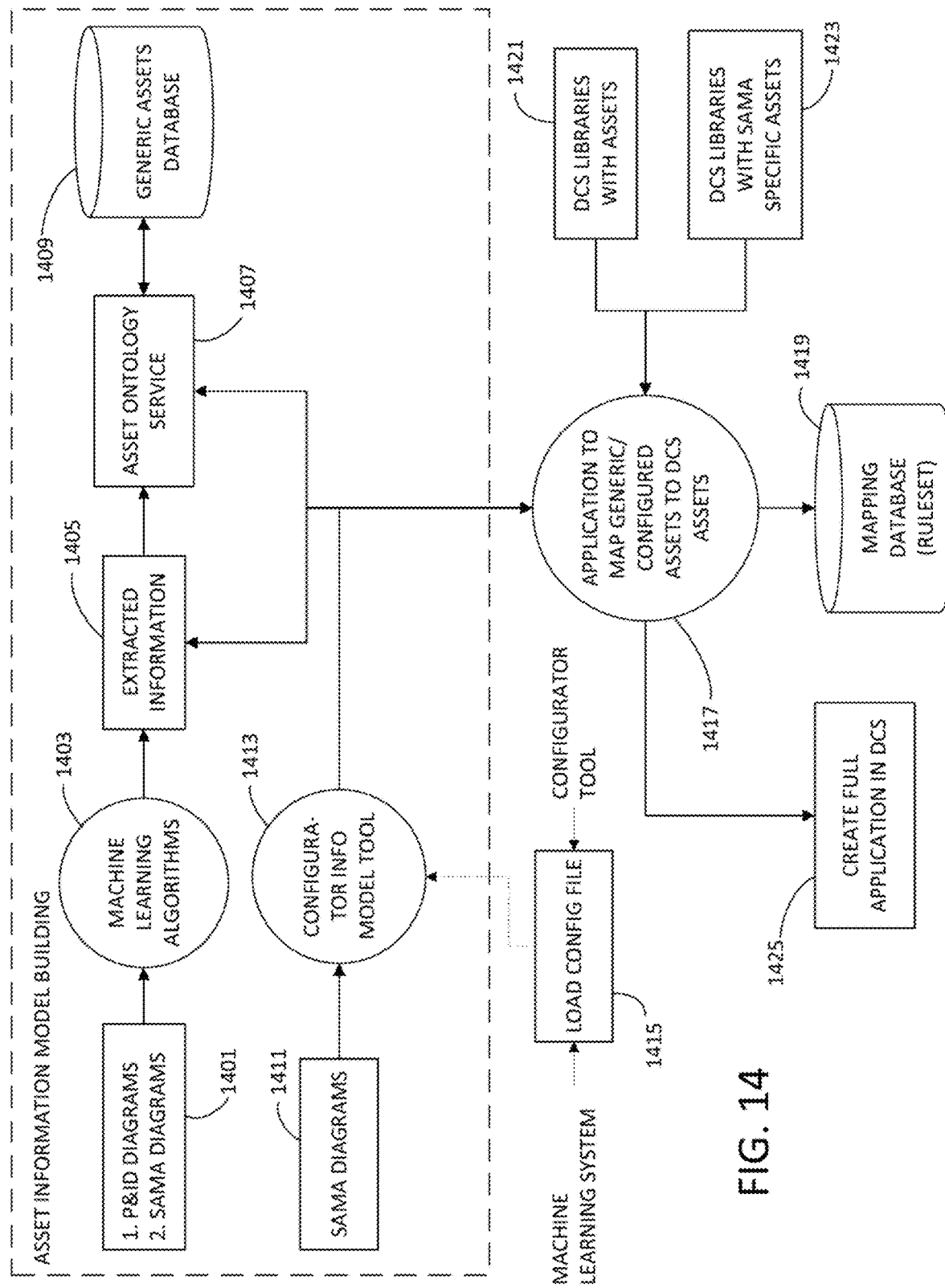
FIG. 14 is a flow diagram of an example process for generating control applications according to an embodiment.

FIG. 14 illustrates further aspects of an example work flow illustrating both machine learning and configurator tool approaches for generating control applications based on an information model input in accordance with the present disclosure. Beginning at 1401, the process receives information model input in the form of a SAMA diagram, a piping and instrumentation diagram (P&ID), or the like. Based on this input, the process of FIG. 14 executes one or more machine learning algorithms at 1403. In an embodiment, the machine learning algorithms are trained based on performance of the process control installation in response to execution of the asset-based control application. The machine learning system, at 1405, extracts information from the received input and, at 1407, retrieves, by an asset ontology service, the modeled assets associated with the process control installation from an assets database 1409 based on the extracted information.

Referring further to FIG. 14, the process receives information model input at 1411 in the form of a SAMA diagram or the like. Based on this input, the process of FIG. 14 executes a configuration tool at 1413 to define the modeled assets associated with the process control installation based on the received input. In the alternative, the process of FIG. 14 loads a configuration file at 1415 directly to the configuration tool at 1413 to define the modeled assets associated with the process control installation based on a configuration software object. In this embodiment, the configuration software object comprises one or more configurable facets based on the received input. In an embodiment, the configuration tool is modified based on performance of the process control installation in response to execution of the asset-based control application.

Proceeding to 1417, the process of FIG. 14 applying mapping ruleset intelligence via database 1419 and retrieves the distributed control assets from the asset library at 1421 and 1423 in accordance with the intelligence. As shown, ruleset intelligence maps the information model to the assets from the asset library in both approaches. The process generates an industrial application at 1425 via the user configuration tool or machine learning intelligence with auto-populated assets and templates loaded from the asset library.

Figure 15:
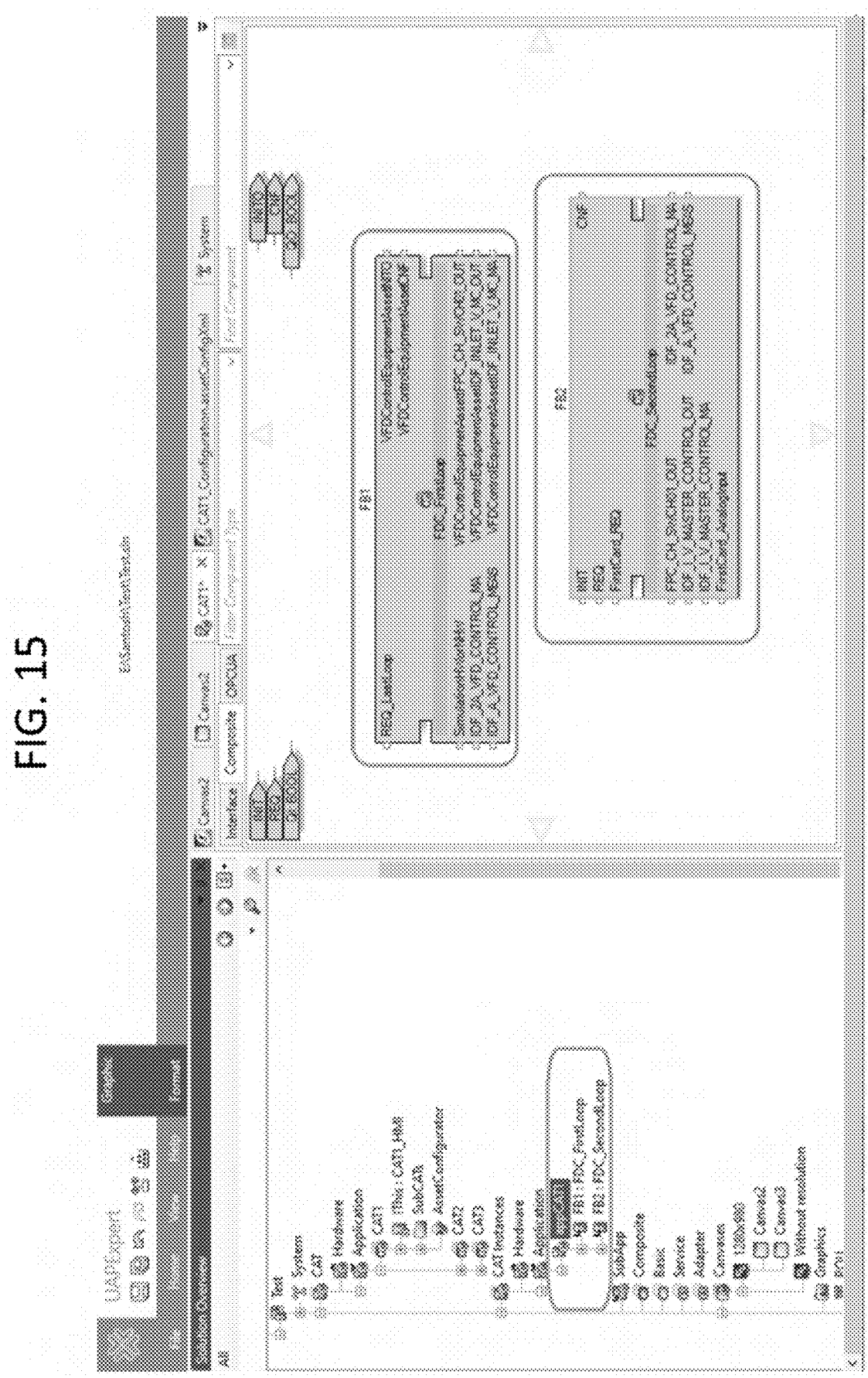
FIGS. 15 and 16 are example screen shots illustrating a user interface of auto-created assets and instances of the assets, respectively, according to an embodiment.
Figure 16:
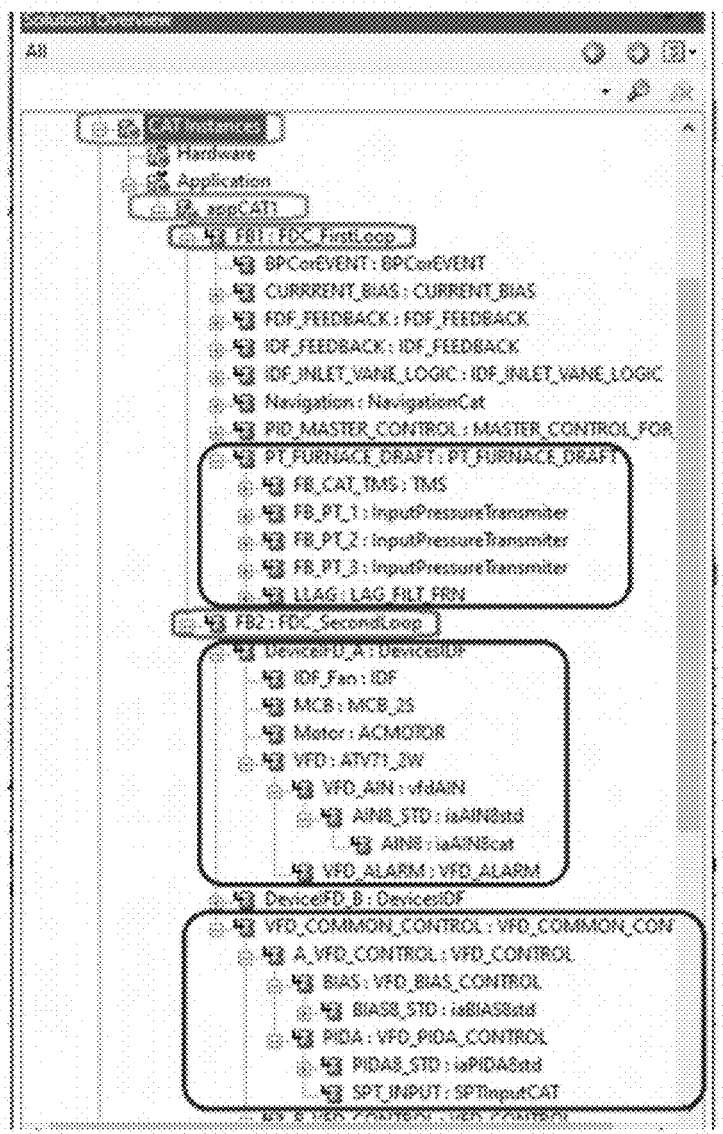

Referring again to FIG. 11 at 1111, the user loads an existing application design file based on the information model and a user-driven ruleset for auto-creating the application. As shown in FIGS. 15 and 16, through use of the configurator tool, a user selects asset automation type (AAT) objects (available through the asset library) and creates the needed industrial application design. The process auto creates assets, or templates comprising of a composition of assets, based on the user selected assets as part of complete application generation.

Figure 17:
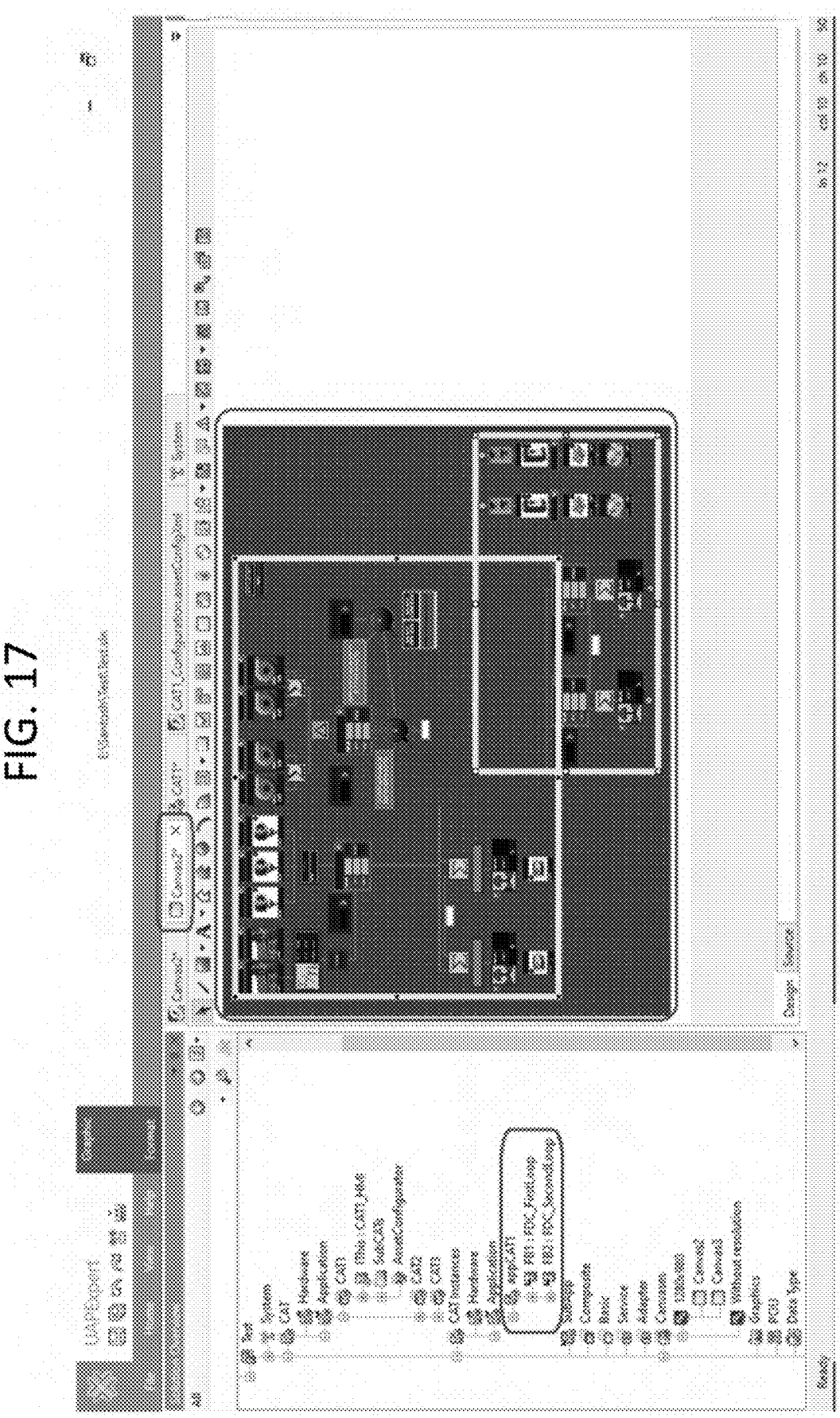
FIG. 17 is an example screen shot of an auto-create human machine interface associated with the assets according to an embodiment.

In an embodiment, the user can create the assets with the configurable facets from the AAT objects. In one example, the user can create an asset comprising facets such as HMI, Documentation, Control Logic, Simulation, and the like to represent an industrial physical asset. In another example, the user can create an asset comprising facets such as HMI, Documentation, Control Logic, Alarms and Events, Historian, Diagnostics, and the like to represent an industrial physical asset. FIG. 17 is an example screen shot of an auto-create human machine interface associated with the assets according to an embodiment. In this embodiment, the process auto creates an HMI mapped to the assets/template of assets created in FIG. 15 through the configurator tool based on user selected assets as part of complete application generation.

Figure 18:
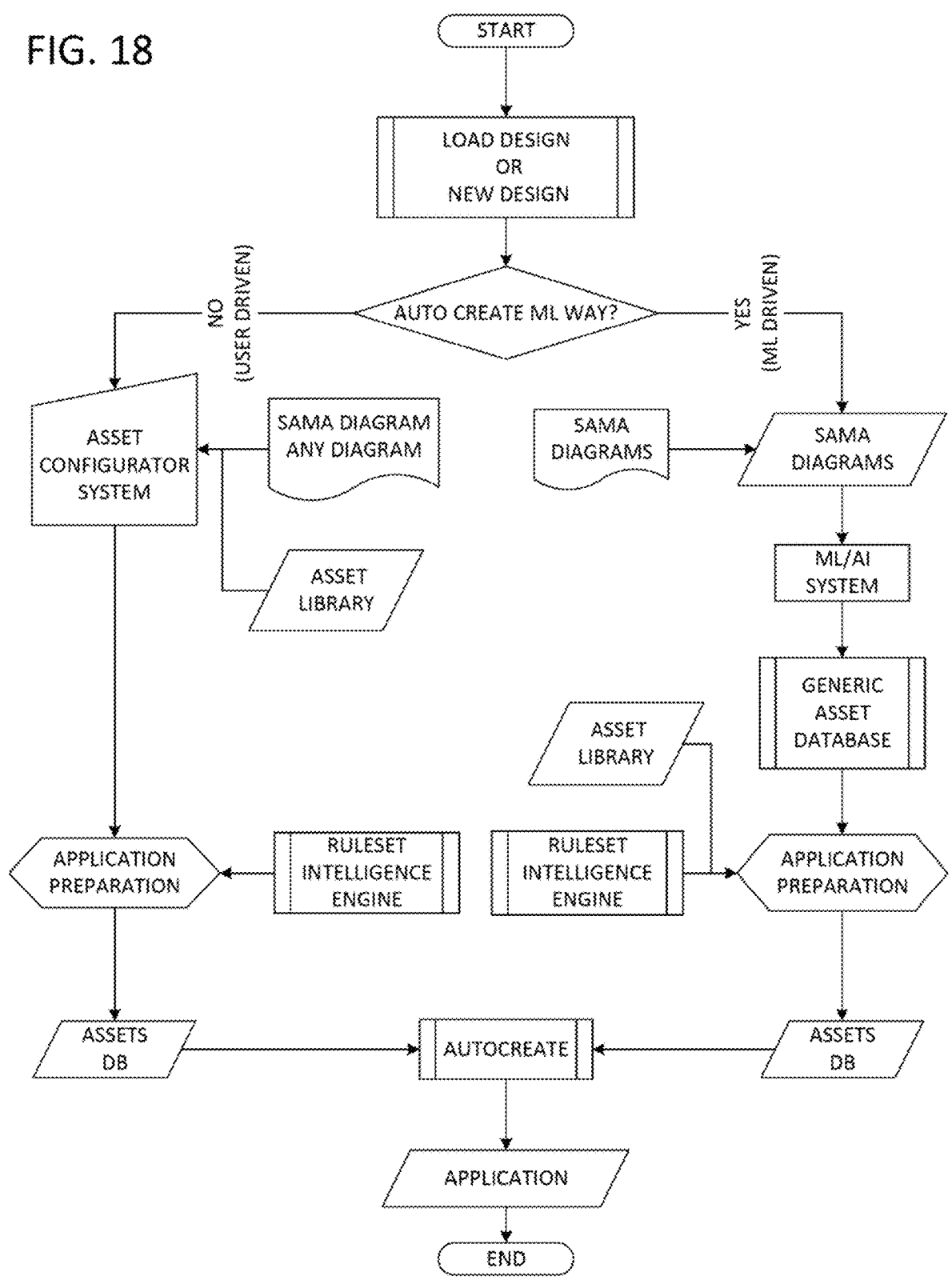
FIG. 18 is a flow diagram illustrating further aspects of the example process of FIG. 14.

FIG. 18 illustrates another example work flow for auto-creating application designs according to either a machine learning or a configurator tool approach.

In operation, a storage memory stores processor-executable instructions that, when executed by a processor, configure the processor for building an asset model representative of a process control installation of the industrial system and creating an asset library of distributed control assets according to a distributed control programming standard. The asset model comprises a plurality of modeled assets defined according to levels of a physical model standard and the distributed control assets each have one or more predefined, built-in facets. The processor-executable instructions further configure the processor for mapping one of the distributed control assets in the asset library to each of the modeled assets to configured the process control installation of an industrial system and generating at least one asset-based control application that, when executed by one or more controllers of the process control installation, provides distributed control of the industrial system.

In an alternative embodiment, building an asset control model for use in configuring a distributed control system includes creating an asset control model library configured to store a plurality of distributed control assets and defining the distributed control assets according to a distributed control programming standard. The distributed control assets represent a process control installation of an industrial system and are mapped from one or more physical assets and one or more control assets defined according to levels of a physical model standard. The distributed control assets with one or more predefined, built-in facets, populate the asset control model library with the distributed control assets having the one or more predefined, built-in facets, and generate at least one asset-based control application that, when executed by one or more controllers of the process control installation, provides distributed control of the industrial system.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. The computing system environment must have real-time access to the sensor-based data associated with the asset or asset set. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multi-processor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A method of configuring distributed control in an industrial system, the method comprising:
    receiving input representative of a process control installation of the industrial system;
    building an asset model representative of the process control installation of the industrial system in response to the received input, the asset model comprising a plurality of modeled assets defined according to levels of a physical model standard, the modeled assets representing physical devices of the industrial system, wherein building the asset model comprises executing one or more machine learning algorithms to extract information from the received input and retrieving the modeled assets associated with the process control installation from an assets database based on the extracted information, and wherein building the asset model comprises executing a configuration tool to define the modeled assets associated with the process control installation;
    creating an asset library of distributed control assets according to a distributed control programming standard, the distributed control assets each having one or more predefined, built-in facets;
    applying a mapping ruleset to the modeled assets to map one of the distributed control assets from the asset library to each of the modeled assets, wherein the distributed control assets configure the process control installation of the industrial system; and
    automatically generating at least one asset-based control application, wherein the at least one asset-based control application is configured for execution by one or more controllers of the process control installation to provide control within a distributed control system of the industrial system.

2. The method of claim 1, wherein the configuration tool defines the modeled assets associated with the process control installation based on at least one of the received input and a configuration software object, the configuration software object comprising one or more configurable facets based on the received input.

3. The method of claim 2, wherein the received input comprises a Scientific Apparatus Makers Association (SAMA) diagram acting as an information model.

4. The method of claim 2, further comprising training the machine learning algorithms based on performance of the process control installation in response to execution of the asset-based control application.

5. The method of claim 2, further comprising modifying the configuration tool based on performance of the process control installation in response to execution of the asset-based control application.

6. The method of claim 1, wherein the facets comprise at least one of the following: Operator HMI, Control (Scan & Event Driven), Alarms & Events, Simulation, Documentation, Historian, Identification/Location, Advisor (System & Condition), IT Required Information/Attributes, Diagnostics/Health Status, and Test Automation.

7. The method of claim 1, wherein applying the mapping ruleset to the modeled assets comprises applying mapping ruleset intelligence and retrieving the distributed control assets from the asset library in accordance with the intelligence.

8. The method of claim 1, wherein the modeled assets comprise one or more physical assets and one or more control assets and wherein the asset model indicates a relationship between the physical assets and the control assets.

9. The method of claim 1, further comprising:
receiving, from a user interface, a user selection of select distributed control assets in the asset library, the user selection indicating a particular quantity, arrangement, and configuration of the select distributed control assets in a proposed industrial system design;
simulating operation of the proposed industrial system design based on a predetermined set of conditions and the one or more asset-based control applications; and
evaluating the simulated operation to identify potential improvements to the proposed industrial system design.

10. The method of claim 9, further comprising auto-populating an application library with the one or more asset-based control applications, wherein the application library includes dependencies among the select distributed control assets.

11. A system comprising:
a processor;
a storage memory coupled to the processor, the storage memory storing processor-executable instructions, wherein the processor-executable instructions are configured for execution by the processor for:
receiving input representative of a process control installation of the industrial system;
building an asset model representative of the process control installation of the industrial system in response to the received input, the asset model comprising a plurality of modeled assets defined according to levels of a physical model standard, the modeled assets representing physical devices of the industrial system, wherein building the asset model comprises executing one or more machine learning algorithms to extract information from the received input and retrieving the modeled assets associated with the process control installation from an assets database based on the extracted information, and wherein building the asset model comprises executing a configuration tool to define the modeled assets associated with the process control installation;
creating an asset library of distributed control assets according to a distributed control programming standard, the distributed control assets each having one or more predefined, built-in facets;
applying a mapping ruleset to the modeled assets to map one of the distributed control assets from the asset library to each of the modeled assets, wherein the distributed control assets configure the process control installation of an industrial system; and
automatically generating at least one asset-based control application, wherein the at least one asset-based control application is configured for execution by one or more controllers of the process control installation to provide control within a distributed control system of the industrial system.

12. The system of claim 11, wherein the configuration tool defines the modeled assets associated with the process control installation based on at least one of the input to build the asset model and a configuration software object, the configuration software object comprising one or more configurable facets based on the input to build the asset model.

13. The system of claim 12, wherein the input comprises a Scientific Apparatus Makers Association (SAMA) diagram acting as an information model.

14. The system of claim 12, wherein the storage memory further stores processor-executable instructions configured for execution by the processor for training the machine learning algorithms based on performance of the process control installation in response to execution of the asset-based control application.

15. The system of claim 12, wherein the storage memory further stores processor-executable instructions configured for execution by the processor for modifying the configuration tool based on performance of the process control installation in response to execution of the asset-based control application.

16. The system of claim 11, wherein the facets comprise at least one of the following: Operator HMI, Control (Scan & Event Driven), Alarms & Events, Simulation, Documentation, Historian, Identification/Location, Advisor (System & Condition), IT Required Information/Attributes, Diagnostics/Health Status, and Test Automation.

17. The system of claim 11, wherein the storage memory further stores processor-executable instructions configured for execution by the processor for applying mapping ruleset intelligence and retrieving the distributed control assets from the asset library in accordance with the intelligence to map the modeled assets.

18. The system of claim 11, wherein modeled assets comprise one or more physical assets and one or more control assets and wherein the asset model indicates a relationship between the physical assets and the control assets.

19. The system of claim 11, wherein the storage memory further stores processor-executable instructions configured for execution by the processor for:
receiving, from a user interface, a user selection of select distributed control assets in the asset library, the user selection indicating a particular quantity, arrangement, and configuration of the select distributed control assets in a proposed industrial system design;

simulating operation of the proposed industrial system design based on a predetermined set of conditions and the one or more asset-based control applications; and evaluating the simulated operation to identify potential improvements to the proposed industrial system design.

20. The system of claim 11, wherein the storage memory further stores processor-executable instructions configured for execution by the processor for auto-populating an application library with the one or more asset-based control applications, wherein the application library includes dependencies among the select distributed control assets.

21. A method of building an asset control model for use in configuring a distributed control system, the method comprising:

receiving input representative of a process control installation of an industrial system;

executing one or more machine learning algorithms to extract information from the received input and retrieving a plurality of distributed control assets associated with the process control installation from an assets database based on the extracted information;

executing a configuration tool to define the distributed control assets according to a distributed control programming standard based on the received input, wherein the distributed control assets represent the process control installation of the industrial system, and wherein the distributed control assets are mapped from one or more physical assets and one or more control assets defined according to levels of a physical model standard;

creating an asset control model library configured to store the distributed control assets;

providing each of the distributed control assets with one or more predefined, built-in facets;

populating the asset control model library with the distributed control assets having the one or more predefined, built-in facets; and automatically generating at least one asset-based control application from the distributed control assets, wherein the at least one asset-based control application is configured for execution by one or more controllers of the process control installation to provide control within a distributed control system of the industrial system.

* * * * *